US012644024B2

(12) United States Patent
Lu et al.

(10) Patent No.: US 12,644,024 B2
(45) Date of Patent: Jun. 2, 2026

(54) LAMINATING ADHESIVE COMPOSITION

(71) Applicant: ARKEMA FRANCE, Puteaux (FR)

(72) Inventors: Gang Lu, Freeport, TX (US); Nolan T. McDougal, Pearland, TX (US); Thomas R. Fielitz, Midland, MI (US)

(73) Assignee: ARKEMA FRANCE, Puteaux (FR)

( * ) Notice: Subject to any disclaimer, the term of this patent is extended or adjusted under 35 U.S.C. 154(b) by 3 days.

(21) Appl. No.: 18/572,022

(22) PCT Filed: Jun. 2, 2022

(86) PCT No.: PCT/US2022/031998

§ 371 (c)(1),
(2) Date: Dec. 19, 2023

(87) PCT Pub. No.: WO2023/009215

PCT Pub. Date: Feb. 2, 2023

(65) Prior Publication Data

US 2024/0301248 A1 Sep. 12, 2024

Related U.S. Application Data

(60) Provisional application No. 63/226,255, filed on Jul. 28, 2021.

(51) Int. Cl.

| | |
|---|---|
| ***C09J 7/35*** | (2018.01) |
| ***C09J 5/06*** | (2006.01) |
| ***C09J 175/04*** | (2006.01) |

(52) U.S. Cl.

CPC . *C09J 7/35* (2018.01); *C09J 5/06* (2013.01); *C09J 175/04* (2013.01); *C09J 2301/312* (2020.08); *C09J 2301/50* (2020.08); *C09J 2475/00* (2013.01)

(58) Field of Classification Search

None

See application file for complete search history.

(56) References Cited

U.S. PATENT DOCUMENTS

| | | | | |
|---|---|---|---|---|
| 2005/0080218 | A1 | 4/2005 | Lothar et al. | |
| 2013/0199725 | A1* | 8/2013 | Gentschev | C08L 25/08 524/505 |
| 2019/0270918 | A1* | 9/2019 | Seehagen | B32B 27/32 |
| 2022/0033694 | A1* | 2/2022 | Yao | D06N 3/0097 |

FOREIGN PATENT DOCUMENTS

| | | | |
|---|---|---|---|
| CN | 111683982 | A | 9/2020 |
| JP | 2009221423 | A | 10/2009 |
| JP | 2010016286 | A | 1/2010 |
| WO | 03051954 | A1 | 6/2003 |
| WO | 2020118746 | A1 | 6/2020 |

* cited by examiner

*Primary Examiner* — Michael N Orlando
*Assistant Examiner* — Abhishek A Patwardhan
(74) *Attorney, Agent, or Firm* — Gemini Law LLP

(57) ABSTRACT

A fire-retardant polyurethane-based laminating adhesive composition including: (a) at least one polyol component; (b) at least one polyisocyanate component; and (c) at least one alkoxysilane hydrolysate or at least one aryloxysilane hydrolysate; wherein the fire-retardant polyurethane-based laminating adhesive composition has a fire retardancy rating of HB in UL94HB testing; a process for making the above fire-retardant adhesive composition; and a process for adhering two substrates together with the above fire-retardant adhesive composition.

15 Claims, No Drawings

LAMINATING ADHESIVE COMPOSITION

FIELD

The present invention relates to a laminating adhesive composition; and more specifically, the present invention relates to a polyurethane-based laminating adhesive composition including a fire-retardant that provides a transparent, halogen-free, phosphorous-free, and environmentally-benign polyurethane-based laminating adhesive composition.

BACKGROUND

Known fire-retarding laminating adhesives typically contain fire-retardants (FR) such as: (1) metal oxide FRs which create hazy appearance in the adhesives; (2) brominated organic FRs which contain the halogen bromine and are not environmentally-benign, and/or (3) chlorinated phosphate FRs which contain the halogen chlorine and are also not environmentally-benign. None of the above known adhesives meet customers' expectations; for example, customers want an adhesive with transparency and low UV yellowing potential; and at the same time, customers want an adhesive without halogens and heavy metals. Therefore, there is a need in the adhesives industry to provide novel FR grade laminating adhesives which are: halogen-free, phosphorous-free, transparent, less likely to exhibit UV-yellowing, and environmentally-benign.

Heretofore, halogen-free, transparent, and fire-retarding laminating adhesives have been formulated by adding phosphorous-based FRs to adhesives. For example, non-halogenated organic phosphate fire retardants (OPFRs) have been used as alternatives to halogenated FRs to provide fire-resistant polyurethane adhesives such as disclosed in EP1456268 B1. However, research suggests that OPFRs, like halogens, may also have some health and safety concerns for people and the environment. Therefore, halogen-free and phosphorous-free FRs, which are safe and do not adversely affect the environment, are highly desired.

In addition, EP1456268 B1 discloses polyurethane adhesives that contained inorganic fillers, halogenated OPFRs, and OPFRs as fire retardants. However, nothing in EP1456268 B1 discloses the use of halogen-free and phosphorous-free fire-retardant additives in polyurethane (PU) laminating adhesive compositions. Other references such as U.S. Patent Application Publication No. 20050011401 A1; U.S. Pat. Nos. 6,547,992, 6,509,401, and 6,255,371; and EP3222691A1 also disclose inorganic fillers, halogenated OPFRs, and OPFRs as fire retardants for uses other than adhesives.

Furthermore, while alkoxysilane hydrolysate is known and disclosed in references such as WO2014033237A1, WO2009074570A1, and WO2011131506A1; the alkoxysilane hydrolysate disclosed in the above references is used for purposes other than as a halogen-free and phosphorous-free fire-retardant additive in PU laminating adhesive compositions.

SUMMARY

The present invention is directed to a novel laminating adhesive composition, for example a polyurethane-based laminating adhesive composition, including at least one alkoxysilane hydrolysate as a fire-retardant (FR) additive in the laminating adhesive composition. Advantageously, the laminating adhesive composition of the present invention: is free of halogens and free of phosphates; has high transparency; exhibits good fire-retardancy; provides a low yellowing potential in weathering tests; and maintains strong adhesion.

In one embodiment, the polyurethane-based laminating adhesive composition of the present invention includes: (a) at least one polyol component; (b) at least one polyisocyanate component; (c) at least one alkoxysilane hydrolysate fire-retardant additive; and (d) optionally, one or more other additives or auxiliary substances.

In a preferred embodiment, the at least one polyol component can include a combination of: (i) at least one first polyol having a molecular weight of above 400 g/mol; and (ii) at least one second polyol having a molecular weight below 400 g/mol. In another preferred embodiment, the at least one polyisocyanate component provides the adhesive with a total NCO/OH molar ratio in the range of from 0.5:1.0 to 5.0:1.0. In still another preferred embodiment, the at least one first polyol component and/or the at least one second polyol component can be at least one diol and/or at least one triol.

In another embodiment, the alkoxysilane hydrolysate FRs can be used for solvent-based adhesives and solventless adhesives, wherein the adhesives are multi-pack compositions (e.g., two-component (2K) type adhesive compositions) or one-pack compositions (e.g., single component adhesive compositions).

In still another embodiment, the present invention includes a process for producing the above fire-retardant laminating adhesive composition.

In yet another embodiment, the present invention includes a process for adhering at least a first substrate and at least a second substrate using the above fire-retardant laminating adhesive composition.

DETAILED DESCRIPTION

Temperatures herein are in degrees Celsius (° C.).

"Room temperature (RT)" and "ambient temperature" herein means a temperature between 20° C. and 26° C., unless specified otherwise.

The term "halogen-free", with reference to an adhesive composition, herein means the adhesive contains no halogen-containing ingredient; and a "halogen" herein includes fluorine (F), chlorine (Cl), bromine (Br), and iodine (I).

The term "phosphate-free", with reference to an adhesive composition, herein means the adhesive contains no phosphate-containing ingredient; and a "phosphate" herein includes compounds containing a ($O{=}PO_3$) radical.

The terms "transparent" or "transparency", with reference to a film material, herein mean the relative transmission light intensity of white light though a laminate PET film containing an FR adhesive of the present invention controls when compared to the relative transmission light intensity of white light though an unlaminated PET film.

The terms "fire-retardant" and "flame-retardant", with reference to an adhesive composition, are used herein interchangeable and both terms are defined using the same test. A "fire-retardant" or "flame retardant" includes chemicals or additives that are applied or added to materials to prevent the start or slow the growth (spread) of fire, as defined according to the National Institutes of Health (NIH; Bethesda, Maryland, U.S).

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term "consisting essentially of" excludes from the scope of any succeeding recitation any other component, step, or procedure, excepting those that are not essential to operability. The term "consisting of" excludes any component, step, or procedure not specifically delineated or listed. The term "or," unless stated otherwise, refers to the listed members individually as well as in any combination. Use of the singular includes use of the plural and vice versa.

The numerical ranges disclosed herein include all values from, and including, the lower and upper value. For ranges containing explicit values (e.g., a range from 1, or 2, or 3 to 5, or 6, or 7), any subrange between any two explicit values is included (e.g., the range 1 to 7 above includes subranges 1 to 2; 2 to 6; 5 to 7; 3 to 7; 5 to 6; and the like).

As used throughout this specification, the abbreviations given below have the following meanings, unless the context clearly indicates otherwise: "=" means "equal(s)" or "equal to"; "<" means "less than"; ">" means "greater than"; "<" means "less than or equal to"; ≥" means "greater than or equal to"; "MT"=metric ton(s); g=gram(s); mg=milligram(s); Kg=kilogram(s); g/L=gram(s) per liter; "g/cm$^3$" or "g/cc"=gram(s) per cubic centimeter; "kg/m$^3$=kilogram(s) per cubic meter; gf=gram-force; gf/in=gram-force per inch; ppm=parts per million by weight; pbw=parts by weight; rpm=revolutions per minute; m=meter(s); mm=millimeter(s); cm=centimeter(s); μm=micron(s), min=minute(s); s=second(s); ms=millisecond(s); hr=hour(s); Pa=pascals; MPa=megapascals; Pa-s=Pascal second(s); mPa-s=millipascal second(s); g/mol=gram(s) per mole(s); g/eq=gram(s) per equivalent(s); $M_n$=number average molecular weight; Mw=weight average molecular weight; pts=part(s) by weight; 1/s or sec$^{-1}$=reciprocal second(s) [s$^{-1}$]; ° C.=degree(s) Celsius; psig=pounds per square inch; kWh/KG-kWh/KG=kilowatt hours per kilogram; kPa=kilopascal(s); %=percent; vol %=volume percent; mol %=mole percent; and wt %=weight percent.

Unless stated otherwise, all percentages, parts, ratios, and the like amounts, are defined by weight. For example, all percentages stated herein are weight percentages (wt %), unless otherwise indicated.

Specific embodiments of the present invention are described herein below. These embodiments are provided so that this disclosure is thorough and complete; and fully conveys the scope of the subject matter of the present invention to those skilled in the art.

In a broad scope, the present invention includes a fire-retardant polyurethane-based laminating adhesive composition, that includes: (1) at least one polyol component (or a hydroxyl group-containing component); (2) at least one polyisocyanate component (or an isocyanate group-containing component); (3) at least one alkoxysilane hydrolysate as the fire-retardant (or flame-retardant and abbreviated "FR") additive for providing fire retardancy to the laminating adhesive composition; and (4) any other desired optional additives or components. For example, in one embodiment the polyurethane-based laminating adhesive composition of the present invention includes: (a) at least one polyol component having two or more hydroxyl groups such as at least one diol, at least one triol or mixtures thereof; (b) at least one polyisocyanate component; (c) at least one alkoxysilane hydrolysate or aryloxysilane hydrolysate which is a non-halogenated and non-phosphonated fire-retardant component; and (d) optionally, one or more other additives or auxiliary substances, as desired.

In a preferred embodiment, the present invention is at least a two-component (2K) solvent-based polyurethane-based laminating adhesive composition. For example, the two-part or 2K system forming the laminating adhesive composition of the present invention can be a mixture of at least one polyol (OH-component) as the first part and at least one isocyanate-terminated urethane part (NCO-component) as the second part. The FR component may be added to: (1) the polyol component (a) of the polyurethane laminating adhesive composition; (2) the isocyanate group-containing component (b) of the polyurethane laminating adhesive composition; or (3) both components (a) and (b). The 2K laminating adhesive composition of the present invention in combination with the halogen-free and phosphorous-free fire-retardant component (c) forms a halogen-free and phosphorous-free fire-retardant laminating adhesive composition. Besides the laminating adhesive composition of the present invention being free of halogens and free of phosphates; advantageously, the adhesive composition exhibits good flame-retardancy, maintains a strong adhesion, has high transparency; has a low potential for yellowing in weathering tests. The halogen-free and phosphorous-free fire-retardant polyurethane laminating adhesive composition of the present invention is ideal for use in manufacturing a packaging article, film article or other articles useful in applications requiring fire retardancy such as window films, soft packaging for automotive, electronics, fire protection equipment, personal protective equipment, and sail cloth applications.

The base components of the polyurethane-based laminating adhesive composition of the present invention include: (a) the at least one polyol component (or hydroxyl group-containing component); and (b) the at least one polyisocyanate component (or an isocyanate group-containing component) to form the 2K laminating adhesive composition. The base components can be selected from any conventional polyol components and any conventional polyisocyanate components known to those skilled in the art of adhesives.

For example, the polyol component, component (a), can be a solution, mixture or blend of one or more polyol compounds wherein the polyol compound or compounds has one or more hydroxyl groups. In one embodiment, the polyol compound useful in the present invention can be selected, for example, from the group consisting of diols; triols; polyether diols (such as polyethylene glycols, polypropylene glycols, polytrimethylene ether glycol, polybutylene glycols, and mixtures thereof); polyester diols; polycarbonate diols; polybutadiene diols; hydrogenated polybutadiene diols; natural products such as castor oil; and combinations thereof.

The total amount of the polyol compound(s), component (a), in the polyurethane-based laminating adhesive formulation can be generally in the range of from 5 wt % to 95 wt % in one embodiment; from 10 wt % to 70 wt % in another embodiment; and from 15 wt % to 60 wt % in still another embodiment based on the total weight of the components in the formulation.

In one preferred embodiment, the polyol component is a combination of two or more polyols including for example, a mixture of (i) at least a first polyol having a molecular weight ($M_n$) of above 400 g/mol; and (ii) at least a second polyol having a $M_n$ below 400 g/mol. The first polyol compound, component (i), the second polyol compound, component (ii), or both compounds (i) and (ii) can be a solution, mixture or blend of one or more compounds.

The polyol used in the polyurethane-based laminating adhesive formulation, in some embodiments, can be selected, for example, from the group consisting of diols, triols, polyether diols, (such as polyethylene glycols, polypropylene glycols, polytrimethylene ether glycol, polybutylene glycols), polyester diols, polycarbonate diols, polybutadiene diol, hydrogenated polybutadiene diol, and natural products, such as castor oil, and combinations thereof. In other embodiments, the polyol compound useful in the present invention can be selected, for example, from the group consisting of polyester diols and castor oil; and mixtures thereof.

In some embodiments, the $M_n$ of the polyol compound can be less than 400 g/mol in one general embodiment, from 30 to 90,000 in another embodiment, and from 70 to 70,000 in still another embodiment.

When a combination of a polyol compound is used in the polyurethane-based laminating adhesive formulation, in some embodiments the amount of in still another embodiment based on the total weight of the components in the formulation. And, in some embodiments, the amount of the polyol compound, component (ii), in the adhesive formulation can be generally in the range of from 5 wt % to 95 wt % in one general embodiment; from 10 wt % to 70 wt % in another embodiment; and from 15 wt % to 60 wt % in still another embodiment based on the total weight of the components in the formulation.

In some embodiments, the first polyol compound (i) and the second polyol compound (ii) when used, can be mixed with conventional mixing equipment and mixing processes to form the polyol component (a).

The isocyanate group-containing component, component (b), useful in the present invention composition can be a single compound; or component (b) can include a mixture, blend, or combination of two or more compounds. The isocyanate group-containing compound, component (b), useful in the adhesive formulation of the present invention can include, for example, aromatic isocyanates, aliphatic isocyanates, or mixtures thereof. One embodiment of aromatic isocyanates useful in the present invention include methylene diphenyl diisocyanate, toluene diisocyanate, and polyisocyanate; and mixtures thereof. One embodiment of an aliphatic isocyanate useful in the present invention includes for example hexamethylene diisocyanate, and isophorone diisocyanate; and mixtures thereof.

In some embodiments, the isocyanate group-containing compound, component (b), useful in the present invention can be selected, for example, from the group consisting of an isocyanate monomer, a polyisocyanate (e.g., dimers, trimmers, and the like), an isocyanate prepolymer, and mixtures of two or more thereof.

In some preferred embodiments, the polyisocyanate compound, component (b), useful in the present invention can be, for example, methylene diphenyl diisocyanate, hexamethylene diisocyanate, and mixtures thereof.

The amount of the polyisocyanate compound, component (b), in the adhesive formulation can be generally in the range of from 2 wt % to 70 wt % in one embodiment; from 5 wt % to 60 wt % in another embodiment; and from 10 wt % to 50 wt % in still another embodiment based on the total weight of the components in the formulation.

In some embodiments of the present invention, when component (a) is mixed with component (b), the at least one polyisocyanate component provides the adhesive composition with a ratio of (a):(b), viz, a total NCO:OH molar ratio in the range of from 0.5:1.0 to 5.0:1.0 in one embodiment; from 0.7:1 to 4:1 in another embodiment; and from 0.8:1 to 3:1 in still another embodiment.

The fire-retardant component, component (c), includes at least one alkoxysilane hydrolysate or aryloxysilane hydrolysate. For example, the at least one alkoxysilane hydrolysate can be a single compound; or component (c) can be a mixture, blend, or combination of two or more compounds. In some embodiments, the FR component of the present invention includes, for example, one or more tetraalkoxysilane hydrolysate, or tetraaryloxysilane hydrolysate or tetrafunctional mixed alkoxyaryloxysilane hydrolysate. For example, in some embodiments, the FR compound, component (c), useful in the present invention can be selected from the group consisting of tetraethoxysilane hydrolysate, tetramethoxysilane hydrolysate, tetraphenoxysilane hydrolysate, and mixtures thereof.

The amount of the FR compound, component (c), in the adhesive formulation can be generally in the range of from 5 wt % to 50 wt % in one embodiment; from 10 wt % to 40 wt % in another embodiment; and from 15 wt % to 30 wt % in still another embodiment based on the total dry weight of the components in the formulation.

Although in one embodiment the present invention is directed to a two-component system, the adhesive formulation of the present invention may be formulated with a wide variety of optional additives to enable performance of specific functions while maintaining the excellent benefits/properties of the present adhesive product. The optional components, component (d), of the polyurethane adhesive may be added to: (1) the polyol component (a) of the polyurethane laminating adhesive composition, (2) the isocyanate group-containing component (b) of the polyurethane laminating adhesive composition; (3) the alkoxysilane hydrolysate fire retardant; and (4) any combination or all of components (a)-(c).

In some embodiments, the optional additives or components useful in the formulation, when used as desired, may include, for example, one or more additives or auxiliary substances selected from the group consisting of: diluents such as water; adhesion promoters such as silanes, epoxy resins, and phenolic resins; rheology modifiers such as organoclays, hydrogenated castor oil/wax, partially crosslinked castor oil, polyamides, overbased sulfonates, hydrophobic modified ethoxylated urethane, and hydrophobically modified polyacrylate copolymer; fillers such as talc, fume silica, metal silicates, and quartz; optical brighteners/UV tracers such as biphenyl-stilbene (e.g., Tinopal® MFW LIQ available from BASF), benzoxazole (e.g., Tinopal® OB CO available from BASF), and triazine-stilbene (e.g., Tinopal® SFP available from BASF); dyes, pigments, or colorants such as iron oxides, titanium dioxide, aluminum lakes, FD&C Blue No. 1, FD&C Blue No. 2, FD&C Green No. 3, FD&C Red No. 40, FD&C Yellow No. 5, and FD&C Yellow No. 6; solvents such as ethyl acetate, methylethylketone, toluene, xylene, and acetone; chain extenders such as glycerin, trimethylol propane, diethylene glycol, propanediol, and 2-methyl-1, 3-propanediol; and catalysts such as dimethyltin dineodecanoate, dibutyltin dilaurate, titanium(IV) butoxide, titanium triisopropoxide, and titanium diisopropoxide bis(acetylacetonate); and mixtures thereof.

The amount of the optional additives, component (d), when used in the adhesive formulation, can be generally in the range of from 0 wt % to 50 wt % in one embodiment; from 0.01 wt % to 40 wt % in another embodiment; and from 0.5 wt % to 20 wt % in still another embodiment based on the total weight of the components in the formulation.

In one broad embodiment, the process for making the FR-containing polyurethane-based laminating adhesive formulation of the present invention includes mixing, admixing, combining, or blending: (a) at least one polyol, such as for example a diol or a mixture of a diol a triol; (b) at least one polyisocyanate component, such as for example, polyisocyanates that provide the adhesive composition with a total NCO/OH ratio in the range of from 0.5:1.0 to 5.0:1.0; (c) at least one alkoxysilane hydrolysate such as for example tetraethoxysilane hydrolysates; and (d) optionally, one or more additives or auxiliary substances, such as for example, additives selected from the group consisting of adhesion promoters, rheology modifiers, fillers, optical brighteners, dyes, colorants, and solvents.

The process for forming the adhesive composition includes, for example, mixing the components (a)-(c) together in the desired concentrations discussed above; and then the one or more additional optional components (d) may be added to the formulation as desired. The process of mixing the components can be carried out at a temperature of from 0° C. to 50° C. in one embodiment; and from 18° C. to 40° C. in another embodiment. The order of mixing of the components is not critical and two or more components can be mixed together followed by addition of the remaining components. The adhesive formulation components may be mixed together by any known mixing process and equipment.

Besides having FR properties in the absence of a halogen (i.e., being halogen-free) and/or in the absence of a phosphate (i.e., being phosphate-free), the FR polyurethane-based laminating adhesive formulation of the present invention formulation of the present invention produced by the process of the present invention has a combination of several advantageous properties and benefits compared to conventional polyurethane adhesive formulations that do not have all of the combined properties of the present invention. For example, in addition to the FR properties, some of the other properties exhibited in combination by the adhesive formulation of the present invention includes good transparency, good adhesion, and low yellowing potential in weathering conditions. And, the adhesive formulation includes a halogen-free, phosphate-free, and environmentally-friendly formulation in combination with all of the aforementioned properties.

For example, the flame retardancy property of the adhesive composition can be based on the UL94 horizontal burn (UL94HB) test which generally provides two qualitative categories: (1) HB=pass with ≤75 mm/min burn rate and (2) Unclassified=no rating with ≥75 mm/min burn rate.

In other embodiments, the transparency property of the adhesive composition can be in the range of from 95% to 100% in one general embodiment; from 96% to 100% in another embodiment; and from 97% to 99% in still another embodiment.

In still other embodiments, the adhesion property of the adhesive composition can be in the range of from 300 gf/in (116 N/m) to 4,000 gf/in (1,544 N/m) in one general embodiment; from 300 gf/in (116 N/m) to 3,000 gf/in (1,158 N/m) in another embodiment; and from 300 gf/in (116 N/m) to 2,000 gf/in (772 N/m) in still another embodiment.

In yet other embodiments, the transparency property of the adhesive composition after 650 hours of ultraviolet (UV) light exposure serves as a proxy for the yellowing potential property of the adhesive composition.

In addition to the above properties/benefits exhibited by the adhesive formulation, as aforementioned, is a halogen-free and phosphate-free formulation.

In some embodiments, the FR polyurethane-based laminating adhesive composition prepared as described above is used to adhere at least a first substrate and at least a second substrate together to form a composite member which, in turn, can be used to fabricate another an article useful for flame retardancy applications.

For example, in one broad embodiment, the process for adhering the at least one first substrate and the at least one second substrate together comprises the steps of: (I) contacting at least a portion of the at least one first substrate with the adhesive composition produced as described above to dispose at least a portion of the adhesive composition on the at least one first substrate; (II) contacting the at least one second substrate with the adhesive composition disposed on at least a portion of the at least one first substrate, wherein the adhesive composition is disposed in between the first substrate and the second substrate; and (III) heating the at least one first substrate, the at least one second substrate, and the adhesive composition to a temperature sufficient to adhere the at least one first substrate to the at least one second substrate via the adhesive composition.

The first substrate can be, for example, a material selected from, but not limited to, the following: (1) metals such as aluminum and aluminum-coated polymer films; (2) fabrics such as polypropylene nonwoven materials; (3) polymeric materials such as polyethylene terephthalate; (4) plastics such as polypropylene and polyethylene, (5) wood materials such as lumber and composite wood; and (6) combinations thereof.

The second substrate can be any one or more of the same materials used for the first substrate as described above, i.e., (1) metals, (2) fabrics, (3) polymeric materials, (4) plastics, (5) wood materials, and (6) combinations thereof; or the second substrate can be any one or more different materials selected from the materials used for the first substrate as described above.

In one embodiment, for example, the at least one first substrate and the at least one second substrate can be film layers of various substrates described above and which are useful for forming, for example, a multilayer (e.g., two or more layers) film composite member which, in turn, can be used to fabricate another an article from the multilayer film such as a packaging article, pouch, bag, or container, and the like.

For example, to form a multilayer film structure, in one preferred embodiment, the process for adhering together the at least one first substrate layer to the at least one second substrate layer includes the steps of: (I) contacting at least a portion of one surface side of the at least one first substrate layer with the adhesive composition produced as described above to dispose at least a portion of the adhesive composition on at least a portion of one surface side of the at least one first substrate layer; (II) contacting the at least one second substrate layer with the adhesive composition disposed on at least a portion of one surface side of the at least one first substrate layer, wherein the adhesive composition is disposed in between one surface side of the first substrate layer and one surface side of the second substrate layer to form an adhesive composition layer in between the first and second substrate layers; and (III) heating the at least one first substrate layer, the at least one second substrate layer, and the adhesive composition layer to a temperature sufficient to adhere the at least one first substrate layer to the at least one second substrate layer via the adhesive composition layer to form a multilayer film structure.

In general, the laminating adhesive composition layer can have a coat weight of from 1.0 pound per ream (ppr; e.g., 1 ream=3,000 square feet; 1 ppr=1.63 gram/$m^2$) to 5.0 ppr in one embodiment, from 1.5 ppr to 4.5 ppr in another embodiment, and from 2.0 ppr to 4.0 ppr in still another embodiment.

The steps (I)-(III) above can be carried out in conventional laminating equipment and processes to form the multilayer structure with the laminating adhesive incorporated therein. The laminating process conditions can be done at ambient temperature or elevated temperatures with a nip pressure of 40 psi (276 KPa). For the heating step (III), the heating can be carried out at a temperature of from 50° C. to 125° C. in one embodiment, from 60° C. to 115° C. in another embodiment, and from 70° C. to 105° C. in still another embodiment.

The FR polyurethane-based laminating adhesive of the present invention can be used, for example, in applications requiring flame retardancy. In some embodiments, the applications for use of the FR polyurethane-based laminating adhesive of the present invention include, for example, window films, soft packaging for automotive, electronics, fire protection equipment, personal protective equipment, and sail cloth.

EXAMPLES

The following Inventive Examples (Inv. Ex.) and Comparative Examples (Comp. Ex.) (collectively, "the Examples") are presented herein to further illustrate the features of the present invention but are not intended to be construed, either explicitly or by implication, as limiting the scope of the claims. The Inventive Examples of the present invention are identified by Arabic numerals and the Comparative Examples are represented by letters of the alphabet. The following experiments analyze the performance of embodiments of compositions described herein. Unless otherwise stated all parts and percentages are by weight on a total weight basis.

The raw materials used in the Examples are described in Table I.

In some embodiments, the alkoxysilane hydrolysate flame-retardant additive, component (c), used in the present invention can be illustrated, for example, by the general chemical formulation or Structure (I) as follows:

Structure (I)

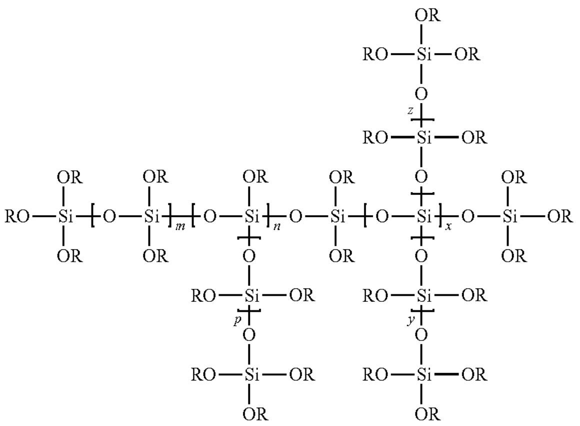

In the above chemical Structure (I), R is $CH_2CH_3$ or $R{=}CH_3$ or aromatic rings; x is from 0 to 500; y is from 0 to 2,000, z is from 0 to 2,000; m is from 0 to 5,000; n is from 0 to 500; and p is from 0 to 2,000. In one embodiment of a compound useful in the present invention and illustrated by the above chemical Structure (I), when $R{=}CH_2CH_3$, the commercial compound contains an equivalent of ~42% $SiO_2$ and is designated as PSI-023. In another embodiment of a compound useful in the present invention and illustrated by the above chemical Structure (I), when $R{=}CH_3$, the commercial compound contains an equivalent of ~50% $SiO_2$ and is designated as PSI-026.

General Procedure for Preparing the FR Adhesives

Part A

A FR adhesive formulation of this Part A is formulated by mixing the adhesive base (e.g., ADCOTE™ 123), ethyl acetate, and a calculated amount of a flame-retardant (based on the dry weight of the adhesive base, ADCOTE™ 123).

TABLE I

| Raw Materials/Ingredients | | |
|---|---|---|
| Material | Brief Description of Material | Source |
| ADCOTE ™ 123 | An adhesive base. | The Dow Chemical Company (Dow) |
| ADCOTE ™ 76P112 | An adhesive base containing halogenated OPFRs. | Dow |
| ADCOTE ™ 76R67-1 | An adhesive base having FR properties. | Dow |
| COREACTANT 9L10 | A crosslinker/catalyst. | Dow |
| COREACTANT 9H1H | A crosslinker/catalyst. | Dow |
| COREACTANT F | A crosslinker/catalyst. | Dow |
| Triethyl phosphate (TEP) | A FR component. | Sigma-Aldrich Corp. |
| Tributyl phosphate (TBP) | A FR component. | Alfa Aesar |
| Triphenyl phosphate (TPP) | A FR component. | Alfa Aesar |
| Poly(diethoxysiloxane, also known as tetraethoxysilane hydrolysate) (PSI023) | An alkoxysilane hydrolysate FR component. | Gelest, Inc. |
| Poly(dimethoxysiloxane, also known as tetramethoxysilane hydrolysate) (PSI026) | An alkoxysilane hydrolysate FR component. | Gelest, Inc. |
| 92-gauge PET film | A first substrate and second substrate. | DuPont Teijin |
| Ethyl acetate | A solvent. | Univar |
| Methyl ethyl ketone | A solvent. | Univar |

The mixture is homogenized on a laboratory can roller (available from US Stoneware, Mahwah, NJ) at 30 rpm for 15 min.

Part B

COREACTANT 9L10 (available from The Dow Chemical Company), of this Part B is used without modification.

The adhesive formulation of Part A and the coreactant of Part B are mixed promptly before use. The mix ratio is the weight of ADCOTE™ 123 (including its original solvent) in a formulation to COREACTANT 9L10. Generally, the mix ratio of Part A:Part B is 100:5.6. The mix ratio of ADCOTE™ 76P112 and Coreactant 9H1H is 100:6.0. The mix ratio of ADCOTE™ 76R67-1 and Coreactant Fis 100:4.2.

General Procedure for Preparing Adhesive Slabs for Thermogravimetric Analysis and UL94 Test.

An adhesive solution in methyl ethyl ketone or ethyl acetate is cast into a low form polytetrafluoroethylene (PTFE) evaporation dish (180 mL, outer diameter=12.1 cm, height=1.9 cm; available from Dynalab Corp.). The solvent is evaporated in a fume hood at 20° C.±2° C. and 50% relative humidity over 24 hr to yield a slab. The slab is heated convectionally for 3 days at 60° C. to drive off any residual solvent.

General Procedure for Preparing Laminates for Testing

In this method, 92-gauge PET films are used as received. A PET film coated with an adhesive ("primary") and an uncoated PET film ("secondary") are used. An adhesive solution with 20 wt % to 30 wt % solid in methyl ethyl ketone is draw-down on a PET film by hand with a Meyer wire-wound rod. The film with the adhesive solution thereon is dried in an oven at 80° C. for 2 min.

The primary PET film coated with the adhesive is laminated to the secondary uncoated PET film on an oil-heated hand laminator with a nip temperature of 180° F. (82° C.) and at a fixed nip pressure of 40 psi (276 kPa). The resultant laminates are placed between two metal plates under a constant weight (3 Kg, 6.6 pounds) and cured at 20° C.±2° C. and 50% relative humidity for 7 days.

Test Methods

Bond Strength

Bond strength measurements are done on 2.54-cm (1-inch) wide strip samples cut from the laminate structures using a fixed-width bond strip cutter. The strength is measured on a QC-3A tensile tester (available from Thwing-Albert Instrument Co., West Berlin, N.J., USA) with a 50 Newton test fixture. The peel rate speed is 25.4 cm/min (10 inches/minute), with pretest distance of 1.27 mm (0.05 inch) and total pulling length of 3.81 cm (1.5 inches). The peak bond strength, the mean bond strength, and the failure mode of each of the strips are recorded. For each laminate, at least 6 replicates are tested. The average peak strength and the failure mode of each laminate are reported.

Thermogravimetric Analysis (TGA)

TGA experiments are conducted on a TA Instruments Discovery TGA with platinum pans holding disposable alumina crucibles with the sample. Each cured adhesive mixture is heated at 2.5° C./min, 5° C./min, 10° C./min, and 20° C./min in air to measure mass loss as a function of heating rate for kinetic calculations. The activation energies for each fire retardant are calculated as a function of conversion by the method described in ASTM E1641 (Ozawa's method).

Accelerated Aging

The accelerated aging test is carried out in a QUV SE tester (Q-Lab Corporation, 800 Canterbury Road, Westlake, OH 44145) using the protocol described in ATSM G154. Laminates are mounted in the QUV and subjected to a cycle of 8 hr UV exposure with an irradiance of 0.89 $W/m^2/nm$ ($\lambda$=340 nm) at 60° C. followed by 4 hr of condensation at 50° C. The accelerated aging test lasted 650 hr.

Yellowness Quantification

The yellowness of the laminates after the accelerated aging is quantified by digital photography and using the software package Image J (available from National Institutes of Health [NIH], Bethesda, Maryland, U.S). Images of a control (aged laminate with ADCOTE™ 123) and aged laminates of the Examples are taken by a digital camera in a darkroom with a light box (A4 Ultra-Thin Portable LED (light-emitting diode) Light Box, available from Amazon.com) as the back light. The camera is attached to a stand, facing down to a film positioned below the camera lens. The distance from the lens of the camera to the film is kept a constant 30 cm.

A digital picture is opened in Image J. An area of 1,000,000 (arbitrary units) is set in the ROI (Region of Interest) manager of Image J. The brightness of the films is then read by Image J in the designated area. The brightness of an aged laminate of the Examples divided by that of the control film yields the transparency index of the laminate.

UL94HB Burning Test

In this burning test, a 1.25 cm×12.0 cm (0.5 inch×4.8 inch) free-standing adhesive film specimen is clamped at one end in a horizontal position. The specimen is marked with the letter "E" (designating "end" of test) at 2 cm from the clamped end of the specimen; and with the letter "S" (designating "start" of test) at 1 cm from the free end (non-clamped end) of the specimen. A Bunsen burner flame is applied to the free end of the specimen for 30 seconds. If combustion of the specimen takes place and the burning front reaches mark S on the specimen, a timer is started. If the burning continues end to end (from mark S to mark E), the time between marks S and E is recorded. If the burning stops before the flame reaches mark E, the time of combustion and the burnt length between the two marks (S and E) are recorded. At least three replicates of specimens for each adhesive are tested.

A linear burning rate in mm/min is calculated for each specimen using the burnt length of the specimen divided by the time recorded for the burning between the marks S and E of the specimen. For specimens with a thickness of less than 3 mm, a burning rate≤75 mm/min receives a horizontal burning flammability rating "HB" in accordance with the UL94HB burning test, whereas samples with a burning rate≥75 mm/min will not be classified.

In the following Examples, unless otherwise specified, the coreactant for the formulations containing ADCOTE™ 123 is COREACTANT 9L10. The coreactants for ADCOTE™ 76R67-1 and ADCOTE™ 76P112 are COREACTANT F and COREACTANT CR 9H1H, respectively.

Examples 1-9 and Comparative Examples A-R: Bond Strength of Laminate Films

Various laminate samples using the adhesive formulations described in Table II were tested for bond strength (peak bond strength) using the bond strength test method described above. The results of bond strength for the various samples are described in Table II.

TABLE II

| Example No. | Adhesive Formulation | Coat Weight (ppr) | Average Peak Bond Strength (gf/in) |
|---|---|---|---|
| Comp. Ex. A | ADCOTE ™ 123 + COREACTANT 9L10 | 2.8 | 697.0 |
| Comp. Ex. B | ADCOTE ™ 76R67-1 + COREACTANT F | 4.2 | 613.6 |
| Comp. Ex. C | ADCOTE ™ 76P112 + COREACTANT 9H1H | 5.0 | 1,658.4 |
| Comp. Ex. D | ADCOTE ™ 123 + COREACTANT 9L10 + 5% TEP | 3.1 | 824.3 |
| Comp. Ex. E | ADCOTE ™ 123 + COREACTANT 9L10 + 10% TEP | 2.5 | 869.3 |
| Comp. Ex. F | ADCOTE ™ 123 + COREACTANT 9L10 + 15% TEP | 2.6 | 823.0 |
| Comp. Ex. G | ADCOTE ™ 123 + COREACTANT 9L10 + 20% TEP | 2.0 | 859.0 |
| Comp. Ex. H | ADCOTE ™ 123 + COREACTANT 9L10 + 30% TEP | 2.8 | 825.6 |
| Comp. Ex. I | ADCOTE ™ 123 + COREACTANT 9L10 + 5% TBP | 2.6 | 759.0 |
| Comp. Ex. J | ADCOTE ™ 123 + COREACTANT 9L10 + 10% TBP | 3.0 | 785.4 |
| Comp. Ex. K | ADCOTE ™ 123 + COREACTANT 9L10 + 15% TBP | 3.5 | 637.6 |
| Comp. Ex. L | ADCOTE ™ 123 + COREACTANT 9L10 + 20% TBP | 3.5 | 779.4 |
| Comp. Ex. M | ADCOTE ™ 123 + COREACTANT 9L10 + 30% TBP | 3.0 | 621.9 |
| Comp. Ex. N | ADCOTE ™ 123 + COREACTANT 9L10 + 5% TPP | 2.8 | 713.1 |
| Comp. Ex. O | ADCOTE ™ 123 + COREACTANT 9L10 + 10% TPP | 3.3 | 827.4 |
| Comp. Ex. P | ADCOTE ™ 123 + COREACTANT 9L10 + 15% TPP | 3.3 | 1,110.3 |
| Comp. Ex. Q | ADCOTE ™ 123 + COREACTANT 9L10 + 20% TPP | 3.3 | 956.3 |
| Comp. Ex. R | ADCOTE ™ 123 + COREACTANT 9L10 + 30% TPP | 3.3 | 1,425.9 |
| Inv. Ex. 1 | ADCOTE ™ 123 + COREACTANT 9L10 + 5% PSI023 | 4.0 | 887.0 |
| Inv. Ex. 2 | ADCOTE ™ 123 + COREACTANT 9L10 + 10% PSI023 | 3.8 | 886.9 |
| Inv. Ex. 3 | ADCOTE ™ 123 + COREACTANT 9L10 + 15% PSI023 | 4.0 | 821.0 |
| Inv. Ex. 4 | ADCOTE ™ 123 + COREACTANT 9L10 + 20% PSI023 | 3.1 | 532.6 |
| Inv. Ex. 5 | ADCOTE ™ 123 + COREACTANT 9L10 + 5% PSI026 | 3.3 | 920.9 |
| Inv. Ex. 6 | ADCOTE ™ 123 + COREACTANT 9L10 + 10% PSI026 | 3.1 | 769.9 |
| Inv. Ex. 7 | ADCOTE ™ 123 + COREACTANT 9L10 + 15% PSI026 | 3.5 | 844.3 |
| Inv. Ex. 8 | ADCOTE ™ 123 + COREACTANT 9L10 + 20% PSI026 | 3.3 | 874.6 |
| Inv. Ex. 9 | ADCOTE ™ 123 + COREACTANT 9L10 + 30% PSI026 | 3.4 | 554.6 |

Examples 10-18 and Comparative Examples S-GG: Transparency Index of Aged Laminates after 650 Hours of QUV Exposure Various laminate samples using the adhesive formulations described in Table III were tested for transparency using the transparency/yellowness qualification method described above. The results of transparency in terms of a transparency index percentage for the various samples are described in Table III.

TABLE III

| Example No. | Adhesive Formulation | Coat Weight (ppr) | Transparency Index (%) |
|---|---|---|---|
| Comp. Ex. S | ADCOTE ™ 123 + COREACTANT 9L10 | 2.8 | 100.0 |
| Comp. Ex. T | ADCOTE ™ 123 + COREACTANT 9L10 + 5% TEP | 3.1 | 100.0 |
| Comp. Ex. U | ADCOTE ™ 123 + COREACTANT 9L10 + 10% TEP | 2.5 | 96.8 |
| Comp. Ex. V | ADCOTE ™ 123 + COREACTANT 9L10 + 15% TEP | 2.6 | 100.4 |
| Comp. Ex. W | ADCOTE ™ 123 + COREACTANT 9L10 + 20% TEP | 2.0 | 100.2 |
| Comp. Ex. X | ADCOTE ™ 123 + COREACTANT 9L10 + 30% TEP | 2.8 | 100.7 |
| Comp. Ex. Y | ADCOTE ™ 123 + COREACTANT 9L10 + 5% TBP | 2.6 | 100.0 |
| Comp. Ex. Z | ADCOTE ™ 123 + COREACTANT 9L10 + 10% TBP | 3.0 | 94.3 |
| Comp. Ex. AA | ADCOTE ™ 123 + COREACTANT 9L10 + 15% TBP | 3.5 | 96.8 |
| Comp. Ex. BB | ADCOTE ™ 123 + COREACTANT 9L10 + 20% TBP | 3.5 | 96.0 |
| Comp. Ex. CC | ADCOTE ™ 123 + COREACTANT 9L10 + 30% TBP | 3.0 | 97.8 |
| Comp. Ex. DD | ADCOTE ™ 123 + COREACTANT 9L10 + 5% TPP | 2.8 | 99.1 |
| Comp. Ex. EE | ADCOTE ™ 123 + COREACTANT 9L10 + 10% TPP | 3.3 | 98.0 |
| Comp. Ex. FF | ADCOTE ™ 123 + COREACTANT 9L10 + 15% TPP | 3.3 | 100.2 |
| Comp. Ex. GG | ADCOTE ™ 123 + COREACTANT 9L10 + 30% TPP | 3.3 | 100.7 |
| Example 10 | ADCOTE ™ 123 + COREACTANT 9L10 + 5% PSI023 | 4.0 | 101.1 |
| Example 11 | ADCOTE ™ 123 + COREACTANT 9L10 + 10% PSI023 | 3.8 | 98.0 |
| Example 12 | ADCOTE ™ 123 + COREACTANT 9L10 + 15% PSI023 | 4.0 | 99.0 |
| Example 13 | ADCOTE ™ 123 + COREACTANT 9L10 + 20% PSI023 | 3.1 | 101.0 |
| Example 14 | ADCOTE ™ 123 + COREACTANT 9L10 + 5% PSI026 | 3.3 | 96.6 |
| Example 15 | ADCOTE ™ 123 + COREACTANT 9L10 + 10% PSI026 | 3.1 | 96.1 |
| Example 16 | ADCOTE ™ 123 + COREACTANT 9L10 + 15% PSI026 | 3.5 | 98.7 |
| Example 17 | ADCOTE ™ 123 + COREACTANT 9L10 + 20% PSI026 | 3.3 | 99.0 |
| Example 18 | ADCOTE ™ 123 + COREACTANT 9L10 + 30% PSI026 | 3.4 | 100.8 |

Examples 19-20 and Comparative Examples HH-KK: Activation Energy by TGA

Various adhesive slab specimens using the adhesive formulations described in Table IV were tested for Activation Energy ($E_a$). The Activation Energy ($E_a$) describes the amount of energy required to undergo a reaction, manifested as weight loss in a specimen (adhesive slab) during combustion. Mass loss is measured with thermogravimetric analysis (TGA) and calculated from the TGA data using the aforementioned Ozawa method. The following Equation (I) is used to fit the data to calculate the activation energy:

$$\ln(\beta) = \ln\left(\frac{A_0 E_a}{g(\alpha)R}\right) - 5.133 - 1.052 * \left(\frac{E_a}{RT}\right) \quad \text{Equation (I)}$$

In the above Equation (I), $\beta$ is the heating rate, $\alpha$ is defined as the conversion of the main combustion reaction (largest mass loss feature, normalized from 0 to 1), $A_0$ is the exponential prefactor, $g(\alpha)$ is the integral of the conversion function $f(\alpha)$, R is the ideal gas constant, and T is the absolute temperature in Kelvin. The above Equation (I) is described, for example, in the following references: Ozawa, T., A New Method of Analyzing Thermogravimetric Data, *Bull. Chem. Soc. Jpn.,* 1965, 38, 1881; and Criado et al., Critical Study of the Isoconversional Methods of Kinetic Analysis, *J. Therm. Anal. Calorim.* 2008, 92 (1), 199-203.

Four pieces were cut from each fully-cured sample of adhesive slab specimen to be tested: these four pieces were analyzed at 2.5° C./min, 5° C./min, 10° C./min, and 20° C./min heating rates in an air atmosphere. For each heating rate above, the temperature was recorded at 10% conversion, 15% conversion, 20% conversion, and 30% conversion, respectively. These data were plotted with $\ln(\beta)$ as a function of 1/T, and the activation energy was extracted from slope (m) of the linearization for each conversion:

$E_a$=−mR/1.052. This slope encompasses data from each of the four pieces cut from the slab.

An increase of the $E_a$ of a specimen (adhesive slab) increases the energy required for the adhesive slab to undergo combustion. As shown in the Examples of Table IV, the FRs used in the polyurethane-based laminating adhesive compositions of the present invention beneficially increase the $E_a$ of the adhesive slabs tested, with the exception of TEP. It is theorized that the significantly lower boiling point of TEP compared to the other examples causes it to evaporate before the sample combusts during the slow heating ramp of the TGA experiment. This FR-deficient sample thus shows a negligible change in $E_a$ compared to Comparative Example HH with no FR additive.

TABLE IV

| Example No. | FR Additive | $E_a$ at 10% loss (KJ/mol) | $E_a$ at 15% loss (KJ/mol) | $E_a$ at 20% loss (KJ/mol) | $E_a$ at 30% loss (KJ/mol) |
|---|---|---|---|---|---|
| Comp. Ex. HH | None | 112 | 128 | 143 | 156 |
| Comp. Ex. II | 20% TEP | 106 | 119 | 132 | 148 |
| Comp. Ex. JJ | 20% TBP | 171 | 164 | 160 | 155 |
| Comp. Ex. KK | 20% TPP | 129 | 157 | 168 | 175 |
| Example 19 | 20% PSI023 | 129 | 143 | 149 | 154 |
| Example 20 | 20% PSI026 | 145 | 164 | 168 | 165 |

Examples 21 and 22 and Comparative Examples LL-OO: Mass Loss Rate by TGA

As described and defined in Examples 19 and 20, samples were analyzed using thermogravimetry to assess the mass loss rate as a function of reaction progress (conversion). As shown in the Examples of Table V, the FRs used in the polyurethane-based laminating adhesive compositions of the present invention beneficially decrease the mass loss rate after some combustion has occurred. Only the FRs of the present invention show such an appreciable reduction, which is theorized to correspond with the char formation observed in silicon-based materials under oxidative conditions.

TABLE V

| Example No. | FR Additive | Conversion Rate at 20% loss (1/min) | Conversion Rate at 30% loss (1/min) | Conversion Rate at 40% loss (1/min) | Conversion Rate at 50% loss (1/min) | Conversion Rate at 60% loss (1/min) |
|---|---|---|---|---|---|---|
| Comp. Ex. LL | None | 0.088 | 0.134 | 0.179 | 0.193 | 0.177 |
| Comp. Ex. MM | 20% TEP | 0.076 | 0.125 | 0.174 | 0.180 | 0.167 |
| Comp. Ex. NN | 20% TBP | 0.083 | 0.125 | 0.168 | 0.250 | 0.232 |
| Comp. Ex. OO | 20% TPP | 0.079 | 0.114 | 0.151 | 0.218 | 0.222 |
| Example 21 | 20% PSI023 | 0.064 | 0.095 | 0.120 | 0.135 | 0.136 |
| Example 22 | 20% PSI026 | 0.083 | 0.102 | 0.115 | 0.122 | 0.122 |

Examples 23 and 24 and Comparative Examples PP-SS: UL94HB Burning Test

Various free-standing adhesive film specimens using the adhesive formulations described in Table VI were tested in accordance with the test method UL94HB Burning Test described above.

TABLE VI

| Example No. | Adhesive Formulation | Thickness (mm) | UL 94 Rating |
|---|---|---|---|
| Comp. Ex. PP | ADCOTE ™ 123 + COREACTANT 9L10 | 1.4 | Unclassified |
| Comp. Ex. QQ | ADCOTE ™ 123 + COREACTANT 9L10 + 20% TEP | 1.0 | HB |
| Comp. Ex. RR | ADCOTE ™ 123 + COREACTANT 9L10 + 20% TBP | 1.4 | HB |
| Comp. Ex. SS | ADCOTE ™ 123 + COREACTANT 9L10 + 20% TPP | 1.4 | HB |
| Example 23 | ADCOTE ™ 123 + COREACTANT 9L10 + 20% PSI023 | 1.3 | HB |
| Example 24 | ADCOTE ™ 123 + COREACTANT 9L10 + 20% PSI026 | 1.3 | HB |

Table II demonstrates that in the presence of alkoxysilane hydrolysate, at 5 wt % to 40 wt % loading levels, the bond performance ADCOTE™ 123 and COREACTANT 9L10 is maintained or slightly improved in some embodiments at the similar coat weights.

Table III shows that after 650 hours of UV radiation-condensation cycles, the PET laminates containing the alkoxysilane hydrolysate exhibited better transparency (anti-yellowing potential) than one of the comparative phosphate FRs (TBP) and similar performance to the other comparative phosphate FRs (TEB and TPP).

Table IV documents the burning activation energy of cured adhesives containing the FRs at 20% loading levels against the control (no FRs) in air. The alkoxysilane hydrolysate FRs demonstrate high activation energies for burning, indicating their capabilities to resist or slow down combustion. The performance of alkoxysilane hydrolysate FRs beats some phosphates FRs at lower conversion, especially at 10% and 20% weight losses.

Table V shows that the alkoxysilane hydrolysate reduce the measured mass loss rate as measured with TGA. This reduction in reaction rate shows that these materials effectively slow combustion relative to the control adhesive.

Table VI describes UL94 Horizontal Burning test results. While the control adhesive received no rating, the adhesives which contain the alkoxysilane hydrolysate FRs received a pass rating of HB.

In summary, novel FR grade laminating adhesives which are halogen-free, phosphorous-free, transparent, less likely to exhibit UV-yellowing, and environmentally benign are realized and enabled by the addition of alkoxysilane hydrolysate.

What is claimed is:

1. A fire-retardant polyurethane-based laminating adhesive composition comprising:
- (a) at least one polyol;
- (b) at least one polyisocyanate component; and
- (c) at least one silane hydrolysate; wherein the fire-retardant polyurethane-based laminating adhesive composition has a fire retardancy rating of HB in UL94 horizontal burn testing; and
- wherein the silane hydrolysate is selected from the group consisting of a tetraalkoxysilane hydrolysate, a tetraaryloxysilane hydrolysate, a tetra-functional mixed alkoxyaryloxysilane hydrolysate, and a mixture thereof.

2. The composition of claim 1, wherein the at least one polyol is a combination of two or more polyols including (i) at least one first polyol and (ii) at least one second polyol.

3. The composition of claim 2, wherein the first polyol has a molecular weight of above 400 g/mol; and wherein second polyol has a molecular weight below 400 g/mol.

4. The composition of claim 1, wherein the at least one polyisocyanate component is prepared from isocyanates such that the total NCO/OH molar ratio of the adhesive composition is in the range of from 0.5:1.0 to 5.0:1.0.

5. The composition of claim 1, wherein the at least one polyol is selected from the group consisting of a polyether diol, a polyester diol, a polycarbonate diol, a polybutadiene diol, a hydrogenated polybutadiene diol, a castor oil, and a mixture thereof.

6. The composition of claim 5, wherein the polyether diol is selected from the group consisting of a polyethylene glycol, a polypropylene glycol, a polytrimethylene ether glycol, a polybutylene glycol, and a mixture thereof.

7. The composition of claim 1, wherein the at least one polyisocyanate component is selected from the group consisting of a methylene diphenyl diisocyanate, a toluene diisocyanate, a hexamethylene diisocyanate, a isophorone diisocyanate, a polyisocyanate, and a mixture thereof.

8. The composition of claim 1, wherein the tetraalkoxysilane hydrolysate is a tetramethoxysilane hydrolysate, a tetraethoxysilane hydrolysate, or a mixture thereof.

9. The composition of claim 1, wherein the at least one polyol, component (a), is present in the composition at a concentration of from 2 weight percent to 30 weight percent, based on the dry weight of the adhesive base; wherein the at least one polyisocyanate component, component (b), is present in the composition at a concentration such that the total NCO/OH molar ratio in the adhesive composition is in the range of from 0.5:1.0 to 5.0:1.0; and wherein the at least one alkoxysilane hydrolysate, component (c), is present in the adhesive composition at a concentration of from 5 weight percent to 30 weight percent, based on the dry weight of the adhesive base.

10. The composition of claim 1, wherein the composition further comprises one or more additives or auxiliary substances; wherein the one or more additives or auxiliary substances are selected from the group consisting of adhesion promoters; rheology modifiers; fillers; optical brighteners; dyes; colorants; solvents; and mixtures thereof.

11. The composition of claim 10, wherein the one or more additives or auxiliary substances are present in the composition at a concentration of from 0.01 weight percent to 50 weight percent, based on the dry weight of the adhesive base.

12. The composition of claim 1, wherein the adhesive composition is free of halogens; wherein the adhesive composition is free of phosphates; wherein the transparency property of the adhesive composition is from 90 percent to 100 percent compared to an adhesive composition in which no fire retardant is included; and wherein the adhesion property of the adhesive composition is from 300 gram-force per inch to 4,000 gram-force per inch.

13. A process for producing a fire-retardant polyurethane-based laminating adhesive composition comprising admixing:
- (a) at least one polyol;
- (b) at least one polyisocyanate component; and
- (c) at least one silane hydrolysate; wherein the mixture of components (a)-(c) forms a fire-retardant polyurethane-based laminating adhesive composition having a fire retardancy of UL94HB passing rating of HB; and
- wherein the silane hydrolysate is selected from the group consisting of a tetraalkoxysilane hydrolysate, a tetraaryloxysilane hydrolysate, a tetra-functional mixed alkoxyaryloxysilane hydrolysate, and a mixture thereof.

14. A process for adhering at least one first substrate and at least one second substrate comprising:
- (I) contacting the at least one first substrate with the adhesive composition of claim 1 to form a coating of adhesive composition disposed on at least a portion of the at least one first substrate;
- (II) contacting the at least one second substrate with the adhesive composition disposed on at least a portion of the at least one first substrate, wherein the adhesive composition is disposed in between the at least one first substrate and the at least one second substrate; and
- (III) heating the at least one first substrate, the at least one second substrate, and the adhesive composition to a temperature sufficient to adhere the at least one first substrate to the at least one second substrate via the adhesive composition to form a composite structure member.

15. The process of claim 14, wherein the at least one first substrate and the at least one second substrate are film layers, and the adhesive composition is a layer disposed in between the at least one first substrate film layer and the at least one second substrate film layer forming a multilayer film structure.

* * * * *